(12) United States Patent
Francel et al.

(10) Patent No.: US 6,220,055 B1
(45) Date of Patent: Apr. 24, 2001

(54) COMPOSITE GLASS ARTICLE AND METHOD OF MANUFACTURE

(76) Inventors: Josef Francel, 1802 Perth, Toledo, OH (US) 43607-1415; Charles P. Duck, 28 Naugatuck Way, Waterville, OH (US) 43566

( * ) Notice: Subject to any disclaimer, the term of this patent is extended or adjusted under 35 U.S.C. 154(b) by 0 days.

(21) Appl. No.: 09/197,116

(22) Filed: Nov. 20, 1998

Related U.S. Application Data

(62) Division of application No. 08/582,710, filed on Jan. 4, 1996, now abandoned, and a division of application No. 08/799,292, filed on Feb. 13, 1997, now Pat. No. 5,910,371.

(51) Int. Cl.[7] ............................. C03C 17/23; C03C 17/30
(52) U.S. Cl. ..................... 65/60.5; 65/60.5; 65/60.51; 65/60.8; 427/553; 427/557; 427/559; 427/397.7; 427/314
(58) Field of Search .................. 65/60.5, 60.51, 65/60.8, 60.52; 427/487, 532, 553, 557, 559, 372.2, 397.7, 314

(56) References Cited

U.S. PATENT DOCUMENTS

| | | |
|---|---|---|
| 3,258,521 | 6/1966 | Francel et al. . |
| 3,460,960 | 8/1969 | Francel et al. . |
| 3,535,070 | 10/1970 | Francel et al. . |
| 3,736,176 | 5/1973 | Francel et al. . |
| 3,850,665 | * 11/1974 | Plumat . |
| 3,850,679 | 11/1974 | Sopko et al. . |
| 3,984,591 | * 10/1976 | Plumat . |
| 3,996,035 | 12/1976 | McHenry . |
| 4,446,241 | 5/1984 | Francel et al. . |
| 4,457,957 | 7/1984 | Novak et al. . |
| 4,530,857 | 7/1985 | Lindner . |
| 4,537,862 | 8/1985 | Francel et al. . |
| 4,554,258 | 11/1985 | Francel . |
| 4,615,916 | 10/1986 | Henderson . |
| 4,728,353 | 3/1988 | Thomas et al. . |
| 5,043,002 | 8/1991 | Dobbins et al. . |
| 5,085,805 | 2/1992 | Ruf . |
| 5,089,039 | 2/1992 | Terneu et al. . |
| 5,108,479 | 4/1992 | Hirano . |
| 5,137,779 | 8/1992 | Hiry . |
| 5,424,008 | 6/1995 | Hira . |
| 5,910,371 | * 6/1999 | Francel . |

OTHER PUBLICATIONS

Glass Engineering Handbook, pp. 17–18, McGraw–Hill.

* cited by examiner

*Primary Examiner*—Deborah Jones
*Assistant Examiner*—Stephen Stein
(74) *Attorney, Agent, or Firm*—Emch, Schaffer, Schaub & Porcello Co., L.P.A.

(57) ABSTRACT

A composite glass article having a chemically modified ceramic surface whose coefficient of thermal expansion is lower than that of the glass substrate is produced by exposing the glass article maintained at a temperature above its annealing point (typically 500° C.) and below its softening point (soda-lime about 725° C.; borosilicate about 800° C.) to an atmosphere containing prescribed metalorganic compounds. The chemically modified ceramic surface in maintained in compression and is a ceramic consisting of members from a specific group of oxides dependent upon the type of glass comprising the substrate. The method for forming the glass composite article includes applying the metalorganic mixture while the glass substrate is maintained at a temperature above its annealing point (typically 500° C.) and below its softening point (soda-lime about 725° C.; borosilicate about 800° C.) to an atmosphere containing prescribed metalorganic compounds. A chemical reaction occurs producing a chemically modified ceramic coating which is in compression relative to the substrate thus conferring increased strength to the glass article.

8 Claims, 1 Drawing Sheet

COMPOSITE GLASS ARTICLE AND METHOD OF MANUFACTURE

"This application is a divisional of application(s) application number 08/582,710 filed on Jan. 4, 1996 now abandoned" International Application 08/799,292 filed on Feb. 13, 1997 U.S. Pat. No. 5,910,371 and which designated the U.S.

BACKGROUND OF THE INVENTION

Efforts have long been made to strengthen glass articles, including flat glass, glass containers formed of ordinary soda lime glass, and borosilicate low expansion articles. These efforts have been directed primarily towards tempering of the glass by a variety of processes including chemical tempering and air tempering which involves rapid cooling of the surfaces of a heated article to place the surfaces in compression. Additionally, it has long been known to apply coatings to glass articles, tempered as well as non-tempered, for a variety of purposes. These processes are exemplified in the following prior art patents: U.S. Pat. Nos. 5,108,479; 5,089,039; 5,085,805; 5,043,002; 4,728,353; 4,615,916; 4,530,857; 4,457,957; 3,996,035: and 3,850,679.

DISCLOSURE OF THE INVENTION

Under the present invention, the glass article is treated while in a heated condition at or above its annealing temperature (typically 500° C. for soda lime and borosilicate glasses) and below the softening point temperature (typically 725° C. for soda lime and 800° C. for borosilicate glasses) with chemicals selected from certain groups of chemicals depending upon the formulation of the glass substrate. Thus, the groups of chemicals used and the way in which they are combined, will vary depending on whether the substrate is (1) ordinary silica-soda-lime glass such as that used for windows or glass containers or (2) low expansion borosilicate glass such as that used for scientific laboratory glassware. The present invention may be used for strengthening a wide variety of glass articles including, but not limited to, flat glass, bent glass, glass containers, glass drinking tumblers, scientific glass, and solar collectors.

Under the present invention, the glass, while in a heated condition at a temperature above its annealing point (typically 500° C.) and below its softening point (typically 725° C. for soda lime and 800° C. for borosilicate glasses) is exposed to an atmosphere containing metalorganic compounds from a specific group. The atmosphere may be gaseous or may include liquids in a fine mist obtained by spraying. The heat from the glass maintained in the above mentioned proper temperature range causes the metalorganic compounds to decompose leaving a chemically modified ceramic surface. The group of metalorganics for use with a specific type of glass will vary depending on the coefficient of thermal expansion of the glass and is selected such that the chemically modified ceramic surface has a coefficient of thermal expansion lower than that of the unmodified glass substrate. In contrast to prior art coatings in which there is a sharp demarcation between the metallic oxide coating and the glass, under the present invention, there is formed a chemically modified ceramic surface created by chemical reaction of the decomposing metalorganics with the surface of the unmodified substrate. If desired, the glass article, concurrent with the application or immediately after the application of the metalorganic compounds, may be subjected to an infrared radiation treatment to enhance the chemical reaction. As a result of the fact that the chemically modified ceramic surface has a lower coefficient of thermal expansion than the substrate, the chemically modified ceramic surface will, upon cooling of the composite glass article (i.e., the glass substrate with the chemically modified ceramic surface), be placed in compression thus providing greater strength for such composite glass article as compared to a similar article formed solely from a similar type of glass without the benefit of the prescribed treatment with the metalorganic compounds.

DETAILED DESCRIPTION OF THE INVENTION

Broadly, the present invention is for a composite article and method of forming in which the article includes: (1) the article of glass known as the substrate having a predetermined coefficient of thermal expansion, and (2) a chemically modified ceramic surface having a coefficient of thermal expansion lower than the coefficient of thermal expansion of the substrate.

Figure 1:
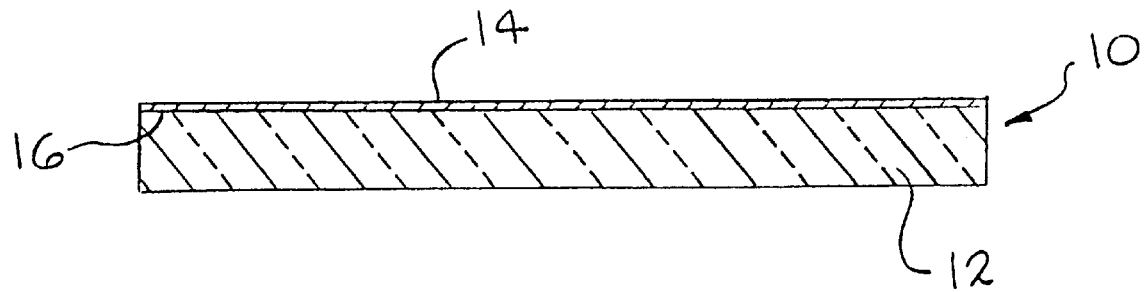
FIG. 1 is a sectional view of a prior art glass article with a coating as heretofore known.

Referring now to FIG. 1, there is shown in section a fragmentary portion of a glass article generally designated by the numeral 10. This article consists of a layer of glass 12 and a coating layer 14 applied thereto by one of the processes disclosed in the prior art references given above or by other means known in the art. For example, U.S. Pat. No. 4,530,857 discloses a process for manufacturing a glass article with a functional coating containing a metal oxide as the principle component. In this process a glass container heated to at least 800° F. is sprayed with a glass coating formulation comprising monoalkyltin trihalide and about 0.5 to 10 parts by weight per hundred parts of monoalkyltin trihalide as a solubilizing material. As another example, U.S. Pat. No. 5,108,479 discloses a process for manufacturing glass with a functional coating wherein a film which contains a metal oxide material such as a alkoxide of Ti, Ta, Zr, In, Sn, Si, or the like is applied to a predetermined portion of a glass plate and then subjecting the glass plate to a bending treatment and/or tempering treatment by heating the same with simultaneous baking of the printed film to thereby form the functional coating containing the metal oxide as the principle constituent. Thus, if the prior art example of FIG. 1 represented the teachings of U.S. Pat. No. 5,108,479, the coating 14 is a metal oxide having been converted from a metal alkoxide applied to the glass plate 12. The thickness of such coating according to the prior art teachings of U.S. Pat. No. 5,108,479 is on the order of 400–2300 Angstroms. It will be noted that under the teachings of U.S. Pat. No. 5,108,479 and other prior art known to the applicants, there is a sharp line of demarcation 16 between glass layer 12 and the coating layer 14.

The metal oxide coating process taught in the prior art, especially in U.S. Pat. No. 4,530,857, provides a metal oxide coating layer 14 to which a polymer coating will adhere thus conferring lubricity and resultant scratch resistance to the article. The strength of the article is not increased by this treatment.

Figure 2:
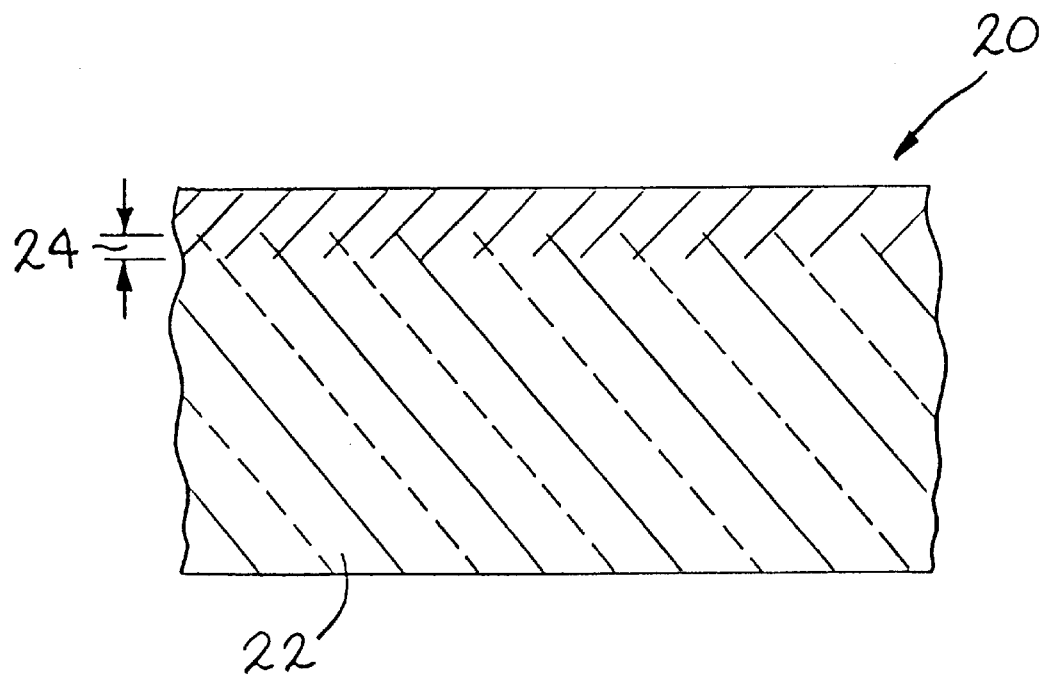
FIG. 2 is a sectional view of the composite glass article of the present invention.

The chemically modified ceramic surface taught by this invention places the substrate in a state of compression that strengthens the article. This modified surface also enhances the chemical durability. FIG. 2 is a diagrammatic representation of a glass composite article 20 of the present invention. The glass composite article 20 includes the soda-lime substrate glass 22 and the modified ceramic surface 24 denoted by a triangle extending into substrate 22.

The metallic, ceramic coating of this invention are prepared from a coating composition including a metal alkoxide and a silicon alkoxide. The alkoxides are represented by the formulas $R_nXO_n$ and $R_4SiO_4$ wherein X is Al, Ti, Ta, Zr, In or Sn; each R group is an alkyl radical having 1 to 8 carbon atoms; and n is an integer ranging from 1 to 4. Preferably, R is an alkyl radical having 1 to 3 carbon atoms, X is Al, and n is the integer 3.

Pyrolysis of the organo-metallic compound leaves a uniform ceramic coating on the substrate which is a mixture of a metal oxide and silicon dioxide. For example, pyrolysis of a mixture of aluminum ethoxide $((C_2H_5)_3 ALO_3)$ and tetraethyl silicate $((C_2H_5)_4 SiO_4)$.

In the embodiment in which the glass substrate 22 is a silica-soda lime glass, the coefficient of thermal expansion will be between 75 and $95 \times 10^{-7}$ per degree C. Under this embodiment the modified ceramic surface will be designed to have a coefficient of thermal expansion less than the substrate 22. The silica-metal oxide ceramics shown in TABLE 1-A will produce surface modifications appropriate for the strengthening of soda lime glass articles.

TABLE 1-A

| Silica/Metal Oxide Ceramics based on a metal oxide | Range of Coefficient of Thermal Expansion $\times 10^{-7}$ per degree C. |
|---|---|
| Zinc Oxide (ZnO) | 52–59 |
| Alumina ($Al_2O_3$) | 48–80 |
| Titania ($TiO_2$) | 59–78 |
| Zirconia ($ZrO_2$) | 67–78 |

In practice metalorganic compounds of silicon and of one or more of the metals, Zn, Al, Ti, or Zr are combined in ratios to give a ceramic coating with the appropriate coefficient of thermal expansion. This mixture is then applied to the soda-lime glass article at a temperature between the annealing and softening points (about 500° C. and 725° C., respectively) of the glass.

In the embodiment in which the glass substrate 22 is a borosilicate glass, the coefficient of thermal expansion will be between 22 and $68 \times 10^{-7}$ per degree C. Under this embodiment the modified ceramic surface will be designed to have a coefficient of thermal expansion less than the substrate 22. The silica-metal oxide ceramics shown in TABLE 1-B will produce surface modifications appropriate for the strengthening of borosilicate glass articles.

TABLE 1-B

| Silica/Metal Oxide Ceramics based on a metal oxide | Range of Coefficient of Thermal Expansion $\times 10^{-7}$ per degree C. |
|---|---|
| 95% Zinc Oxide (ZnO) + 5% Silica ($SiO_2$) | 8–27 |
| Alumina ($Al_2O_3$) + Boric Oxide ($B_2O_3$) | 14–28 |

TABLE 1-B-continued

| Silica/Metal Oxide Ceramics based on a metal oxide | Range of Coefficient of Thermal Expansion $\times 10^{-7}$ per degree C. |
|---|---|
| 65% Zirconia ($ZrO_2$) + 35% Silica | 23–28 |

In practice metalorganic compounds of silicon and of one or more of the metals, Zn, Al, Zr, or the non-metal B, are combined in ratios to give a ceramic coating with the appropriate coefficient of thermal expansion. This mixture is then applied to the borosilicate glass article at a temperature between the annealing and softening points (about 500° C. and 800° C., respectively) of the glass.

As an alternate method of producing a chemically modified ceramic surface multi-component formulations may also be used. Table 1-C sets forth specific examples of compositions with specified coefficients of thermal expansion.

TABLE 1-C

| Coefficient Of Thermal Expansion $\times 10^7$ per degree C. | 5 | 13 | 24 | 32 | 33 |
|---|---|---|---|---|---|
| Member | Approximate Percentage of Member in Formulation | | | | |
| $SiO_2$ | 62 | 70 | 70 | 62 | 64 |
| $Al_2O_3$ | 13 | 23 | 25 | 26 | 21 |
| $B_2O_3$ | 1.5 | 4 | 5 | 0 | 0 |
| RO where R maybe Ca, Mg or Sr | 23.5 | 3 | 0 | 12 | 15 |
| Total Percentage | 100 | 100 | 100 | 100 | 100 |

In manufacturing the composite article 20 of the present invention, the glass substrate 22 is maintained at a temperature above the annealing point (about 500° C.) and below the softening point (soda-lime about 725° C.; borosilicate about 800° C.) of the glass and, while maintained in this range, it is brought into contact with the appropriate metalorganic mixture in an oxygen deficient atmosphere. This is done by spraying, atomizing, or otherwise providing a gaseous atmosphere for effecting chemical vapor deposition by means known in the art. Sufficient time is allowed for the chemical reaction producing the chemically modified surface to occur.

The metalorganic compounds selected as carriers for Si (silicon) and for each of the metals shown in TABLES 1-A and 1-B and 1-C are selected on the basis of properties such as viscosity, reactivity, compatibility, and safety factors.

EXAMPLES

Using the teachings of this invention, two types of articles were prepared to demonstrate the chemical modification of the surface and the subsequent effect of enhancing the chemical durability and strength as measured by the modulus of rupture.

Example 1

Chemical Durability

In this example of the application of the teachings of this invention, small soda-lime glass containers similar to articles called baby food jars were treated according to the requirements set forth above in this invention. For this example a 50:50 mixture of tetraethyl ortho-silicate and aluminum sec-butoxide was prepared by mixing equal volumes of these metalorganic compounds. This mixture was then applied as an atomized spray to the hot bottle surfaces according to the teachings above. The samples were then allowed to cool such that they would then be annealed according to prior art. Other bottles of the same type were similarly treated with the exception that they were not exposed to the mixture of the metalorganic chemicals specified above. These bottles were the "controls". The Chemical Durability of the treated and untreated bottles were then measured according to the procedure known as "Test Methods for Resistance of Glass Containers to Chemical Attack", ASTM C225-85, Method B-W.

This procedure determines the volume of sulfuric acid ($H_2SO_4$) of specified concentration required to neutralize the alkali leached from the inside surface of the container under specific treatment conditions. The better the durability, the less alkali is leached from the container which in turn is neutralized by a smaller volume of sulfuric acid than that required by a container of inferior durability. TABLE 2 shows the results of the chemical durability test.

TABLE 2

|  | ml of 0.020N $H_2SO_4$ | Average ml of 0.020N $H_2SO_4$ |  |
|---|---|---|---|
| Untreated Container |  |  |  |
| Control 1 | 1.41 |  |  |
| Control 2 | 1.34 |  |  |
|  |  | Average | 1.38 |
| Treated Container |  |  |  |
| #1 | 0.71 |  |  |
| #3 | 0.83 |  |  |
| #3 | 0.63 |  |  |
| #4 | 0.59 |  |  |
|  |  | Average | 0.69* |

*In the ASTM method for chemical durability, a lower valve indicates improved durability.

It is seen from the data presented in TABLE 2 that the average chemical durability has been improved by a factor of 2, a 100% improvement, as the result of the ceramic surface modification procedure taught by this invention.

Example 2

Strength (Modulus of Rupture)

In this example of the application of the teachings of this invention, soda lime glass rods ¼ inch diameter by approximately 7 inches long were treated according to the requirements set forth above. For this example a 50:50 mixture of tetraethyl ortho-silicate and aluminum sec-butoxide was prepared by mixing equal volumes of these metalorganic compounds. This mixture was then applied as an atomized spray to the hot rod surfaces according to the teachings above. The samples were then allowed to cool such that they would then be annealed according to prior art. Other rods of the same type were similarly treated with the exception that they were not exposed to the mixture of the metalorganic chemicals specified above. These rods were the "controls". The Modulus of Rupture of the treated and untreated rods was then measured according to the procedure known as "Method for Flexure Testing of Glass (Determination of Modulus of Rupture)", ASTM C158-80. This procedure determines the Modulus of Rupture, a measure of the breaking strength. In this test an increasing load measured in pounds is applied at a constant rate to the glass rod. The load L at break is then used in the following formula to evaluate the Modulus of Rupture in psi (pounds per square inch):

$$\text{Modulus of Rupture} = 5.09_2 * La/bd^2$$

where a=1 inch (a value fixed by the dimensions of the device used to apply the breaking force in 2 point loading), b is the maximum diameter of the rod, and d is the minimum diameter. This corrects for the elipticity of the glass rod which is ordinarily not exactly round. TABLE 3 shows the results of the Modulus of Rupture test.

TABLE 3

|  | Modulus of Rupture, psi | Average Modulus of Rupture psi |
|---|---|---|
| Untreated Rods |  |  |
| Control A-1 | 9,450 |  |
| Control A-2 | 15,200 |  |
| Control A-3 | 14,100 |  |
| Control A-4 | 11,100 |  |
| Control A-5 | 14,100 |  |
|  |  | Average 12,800 |
| Treated Rods |  |  |
| B-1 | 28,800 |  |
| B-2 | 21,600 |  |
| B-3 | 15,600 |  |
| B-4 | 26,800 |  |
| B-5 | 18,900 |  |
| B-6 | 19,400 |  |
| B-7 | 19,800 |  |
| B-8 | 22,700 |  |
| B-9 | 13,400 |  |
| B-10 | 26,100 |  |
| B-12 | 22,700 |  |
|  |  | Average 21,400 |

It is seen from the data presented in TABLE 3 that the average Modulus of Rupture has been improved by a factor of 1.67, a 67% increase in average strength as the result of the ceramic surface modification procedure taught by this invention.

To further establish that the surface of the rods had been modified with respect to their chemical composition, the surfaces of untreated control rods and ceramic surface modified rods were examined for the presence of aluminum using Electron Microprobe techniques. In this measurement the rod is placed in an high vacuum and bombarded with high energy electrons focused to a small spot on the surface of the rod. The electrons cause the atoms in the surface of the glass to emit their own characteristic x-rays with an intensity proportional to the concentration of atoms at or near the surface of the rod. Thus, by comparing the intensities of the characteristic Al Ka x-rays emitted by the aluminum atoms in the control sample with those emitted by the aluminum atoms of the ceramic surface modified rods, it was possible to confirm that the treatment taught by this invention modified the surface of the treated rods.

In this procedure both the untreated control rods and ceramic surface modified rods were cleaned in an ultrasonic bath to remove any mechanically adhering particles or dust of silica or alumina which had not chemically reacted with the substrate glass, 22 in FIG. 2. The results of the Electron Microprobe studies are shown in TABLE 4.

TABLE 4

| | Intensity of Al Kα X-Rays, cps | Treated Rods Cleaned | Intensity of Al Kα X-Rays, cps |
|---|---|---|---|
| Untreated Rods Cleaned | | | |
| Control A-1 | 25 | (Exterior Surface) | |
| Control A-1 | 22 | (Interior Fracture Surface) | |
| | | Average | 24 |
| Treated Rods (Exterior Surface) Cleaned | | | |
| B-1 | 239 | | |
| B-3 | 113 | | |
| B-4 | 132 | | |
| B-9 | 134 | | |
| | | Average | 155 |

It is seen from the data presented in TABLE 4 that the average Al Kα x-ray intensity from the Aluminum atoms in the ultra-sonically cleaned surface of rods having the ceramic surface modification prepared according to the teachings of this invention is significantly greater than the corresponding intensity from untreated control rods by a factor of 6.5 or 550%. The chemically applied ceramic surface modification prepared according to the teachings of this invention has an aluminum concentration significantly greater than in the untreated control.

The microprobe analysis amply demonstrates that the surface of the rods, 24 of FIG. 2, has been substantially modified by applying the techniques of this invention to the substrate 22 of FIG. 2.

Many modifications will become readily apparent to those skilled in the art. Accordingly, the scope of the present invention should be determined only by the scope of the appended claims.

We claim:

1. A method of forming a glass composite article comprising the steps of:
   (a) providing a glass substrate having a predetermined coefficient of thermal expansion;
   (b) maintaining said substrate at a temperature above the annealing point and below the softening point temperatures;
   (c) bringing said substrate maintained within said temperature range into contact with an atmosphere of a mixture of metalorganic compounds and silicon organic compounds;
   (d) causing the mixture to decompose and react with the substrate to produce a metallic ceramic surface having a lower coefficient of thermal expansion than the glass substrate, and to produce a transition layer comprising a mixture of the metallic ceramic surface and the glass substrate; and
   (e) cooling the composite article wherein the lower coefficient of thermal expansion holds the metallic ceramic surface in compression on the glass substrate.

2. The method of forming a glass composite according to claim 1 wherein said step of causing the mixture to decompose and react with the substrate to produce the ceramic surface is enhanced by the absorption of infrared energy at the surface of said article.

3. The method of forming a glass composite according to claim 2, wherein said infrared energy has a peak energy at one micron wavelength.

4. The method of forming a glass composite according to claim 1 wherein said substrate has a coefficient of thermal expansion on the range of 75 to $95 \times 10^{-7}$ per degree C. and said chemically modified ceramic surface has a coefficient of thermal expansion between 48 and $80 \times 10^{-7}$ per degree C.

5. The method according to claim 1 wherein the mixture of metal organic compounds and silicon organic compounds is a mixture of a metal alkoxide and silicon alkoxide.

6. The method according to claim 5 wherein the alkoxides are represented by the formulas $R_nXO_n$ and $R_4SiO_4$ wherein X is Al, Ti, Ta, Zr, In or Sn, each R group is an alkyl radical having 1 to 8 carbon atoms and n is an integer ranging from 1 to 4.

7. The method according to claim 6 wherein each R group is an alkyl radical having 1 to 3 carbon atoms, X is Al and n is the integer 3.

8. The method according to claim 5 wherein the mixture of organic compounds is a mixture of aluminum ethoxide $((C_2H_5)_3 AlO_3)$ and tetraethyl silicate $((C_2H_5)_4 SiO_4)$.

* * * * *